Aug. 29, 1967  R. E. LIROT  3,337,956

PROCESS OF MANUFACTURING DENTAL PROSTHESIS

Filed Jan. 16, 1964

United States Patent Office 3,337,956
Patented Aug. 29, 1967

3,337,956
PROCESS OF MANUFACTURING DENTAL PROSTHESIS
René Edouard Lirot, 228 Blvd. Mohamed V, Casablanca, Morocco
Filed Jan. 16, 1964, Ser. No. 338,265
Claims priority, application France, Jan. 18, 1963, 479, Patent 1,344,711
3 Claims. (Cl. 32—2)

The present invention has for its object a standardization of the technique of dental laboratories for the manufacture of fixed or removable prosthesis, which increases their solidity and their aesthetic qualities, and also increases the production capacity of the laboratories.

This standardization is obtained by the use of supporting elements or holders, and the use of artificial teeth especially shaped so as to be adapted for mounting thereon. The factors governing the attainment of equilibrium of the forces acting on the artificial teeth have been the object of a special study, and these factors have been considered in the provision of prosthetic dental devices which avoid the drawbacks of the various types of teeth presently used for the production of modern prosthesis.

The drawbacks of the various devices presently used are as follows:

(1) Risk of breaking of the teeth which slide relative to each other and which are frequently unsealed and are not of good appearance because of the always visible metallic straps joining the artificial teeth to each other.

(2) Difficulty in casting the teeth with platinum clamps, which results in a waste of time for their adjustment, in slow heating, and in the ever present risk of bursting the artificial teeth as a result of the temperature changes.

(3) Frequent breaking of the metallic straps, which are sometimes handmodelled.

(4) Difficulty in repairing the constitutive parts of the framework when the apparatus is in the mouth of the patient.

(5) Bad appearance of the systems presently known for securing artificial teeth in place, because of the visible metallic strap, and moreover because of the fact that no space is left between two consecutive teeth.

(6) Bad health conditions, because of the inaccurate manner in which the various parts forming the prosthesis are fitted together, because of the relatively large area of the resin or metal part seating against the mucous membrane of the gum, and because the cement sealing material and autopolymerizing resins cause inflammation when a repair is made without removing the apparatus from the mouth of the patient.

(7) The cost price of existing dental prosthetics is very high.

The present invention avoids the drawbacks above listed, and gives to the prosthesis a strong seating, by means of a standard metallic strap which is practically invisible and permits each tooth to be individually interchanged, and which secures an aesthetic aspect never before attained.

To this purpose, the present invention has for its object a new method improving the conditions of manufacture of the prosthesis, and a new process for fixing one or several teeth upon any type of prosthesis.

The invention permits prosthesis to be produced much more rapidly than in the past with the conventional methods heretofore used.

The process according to the present invention is characterized in that a single seating is provided with parts for the individual fixation of each tooth, this seating being constituted by standard support elements, each being adapted to the size and position of the teeth, the elements being connected to each other, and filled up with metal, so as to be exactly adapted to the anatomy of the patient.

According to a feature of the process, each tooth is adjusted on wax to the anatomy of the patient, a plaster pattern of the setting is made and each tooth, after withdrawal of the wax, is arranged in the pattern and provided with a supporting element; all the supporing elements are then temporarily connected to each other by wax, and the teeth withdrawn. Then, the elements are connected to each other in a definitive manner, and fixed to the central pillar by the metal which is poured in these elements.

The invention is also directed to a supporting element permitting the above process to be carried out, characterized in that its shape is that of a channel, one wing of this small channel being shorter than the other, with an edge extending outwardly and constituting a seat for the lingual or palatine part of the tooth, one or several lugs being arranged in the bottom of the channel. In addition to the fact that these lugs prevent accidental rotation of the teeth, and therefore their unsealing, this device permits a complete seating of the tooth on a metallic support.

An exemplary embodiment of the invention will now be described for purposes of illustration but not of limitation, with reference to the accompanying drawing in which.

Figure 4:
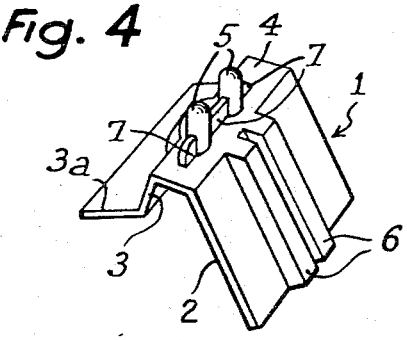
FIG. 4 is a perspective view of another supporting element provided with two lugs.
Figure 3:
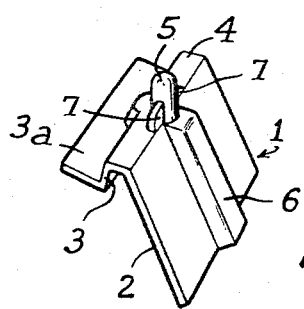
FIG. 3 is a perspective view of a supporting element provided with a single lug.

In the embodiment shown in the drawing, each supporting element 1 is constituted (FIGS. 3 and 4) by a plate having the shape of a flume or channel, with open extremities, one wing 2, being longer than the other wing 3. On the outer part of the bottom 4 of the channel are provided one or two lugs 5.

The lug or lugs 5 may be of different shapes, depending on the type of tooth to be supported; the cross-section may be circular, as shown, or square, rectangular or oval, connected together or separated from each other, single or double. The axis of each lug 5 is approximately perpendicular to the bottom 4 of the channel and opposite to a groove defined in a rib 6 which is located on wing 2 and extends down to the lower edge thereof.

The elements provided with two lugs (FIG. 4) have two ribs 6 each defining a groove at the inside for securing good immobilization of the teeth. A flange 3a extends from wing 3 and, with the latter, encloses an angle which is wider than a right angle, and thus supplies the tooth with a full metallic seating, the shape of which also contributes to its safe fixation.

As a matter of fact, the angle between flange 3a and wing 3 is precisely calculated so that, when the prosthesis is in use, the force acting on each tooth thereof has a direction lying within the angle enclosed by the wing 3 and flange 3a of the related supporting element. Moreover, when each lug 5 is of circular cross-section, as shown, blades 7 extend longitudinally on the supporting element from the lug or lugs 5 so as to avoid any rotation of the tooth.

The supporting elements 1 may be produced by means of any known method, and may be of any metal or alloy, and not necessarily provided with a lug. Each supporting element may support one or several teeth.

The process for manufacturing a prostesis in accordance with this invention is as follows:

In manufacturing a bridge, the crowns or pillars which will support the bridge are first prepared, and then the practitioner takes an impression of the gum area involved. A plaster cast is made from such impression, and a wax film is provided on the plaster cast so that the artificial teeth can be adhered to the wax film.

Articulation and setting of the artificial teeth on the wax are proceeded with; the wax mounted prosthesis is then placed into the mouth for a test, so as to control the articulation and make any necessary aesthetical adjustments. In particular, the artificial teeth may be cut so as to stand in a line with the adjacent natural teeth, as they would be shaped if of maximum length.

The special shape given to the inner part of the artificial teeth for engagement with the supporting elements 1 prevents them from being disengaged from the wax during the fitting and adjusting, which is an additional advantage of the invention.

The practitioner takes a vestibular casting of the artificial teeth mounted in the wax,, i.e. a plaster mold is made of the front face of the assembly. Then this plaster mold is dipped into boiling water to remove the wax and the teeth are taken out of the plaster mold and secured to supporting elements 1.

Each supporting element is re-shaped so its flange 3a reaches to exactly the adjusted surface of the tooth at the mucous membrane. The tooth and its supporting element are put back into the plaster mold. The same operation takes place for each tooth and its supporting element composing the framework so that the elements introduced into the various teeth stand in a line to define a discontinuous channel between the pillars. The channel is filled up with wax and cast rods are introduced into the wax, no modelling being necessary.

After removal of the artificial teeth from the supporting elements 1, metal casting by the lost wax or "cire perdue" process is then effected. If the support elements 1 are formed of metal or alloy, the result is the interconnection of the various support elements 1, so as to form the framework, and simultaneously the plate 9 cast to fit the required anatomic shape. However, if support elements 1 are formed of a synthetic material mixed with wax which is lost during the cire perdue casting process, then a homogeneous, one-piece framework 8 is obtained, as shown on FIG. 2. In that case, great care is to be exercised in the casting as the synthetic material mixed with wax constituting the elements 1, when heated, produces a varnish, which galvanizes the inner surface of the plaster mould and permits one to obtain castings which are perfectly accurate and also permit the immediate sealing or cementing of the teeth on the respective lugs with no adjustment being necessary.

Figure 1:
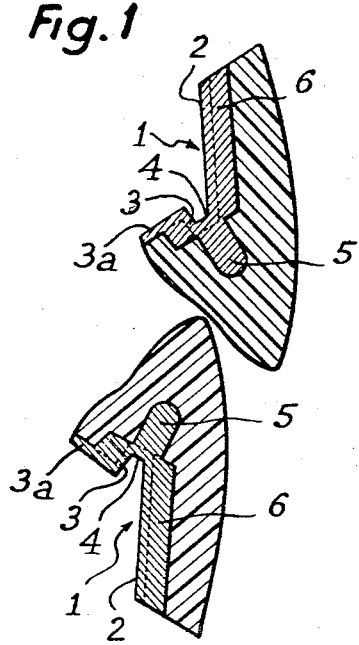
FIG. 1 is a sectional view of two opposite incisive or canine teeth with their suporting elements in accordance with this invention.
Figure 2:
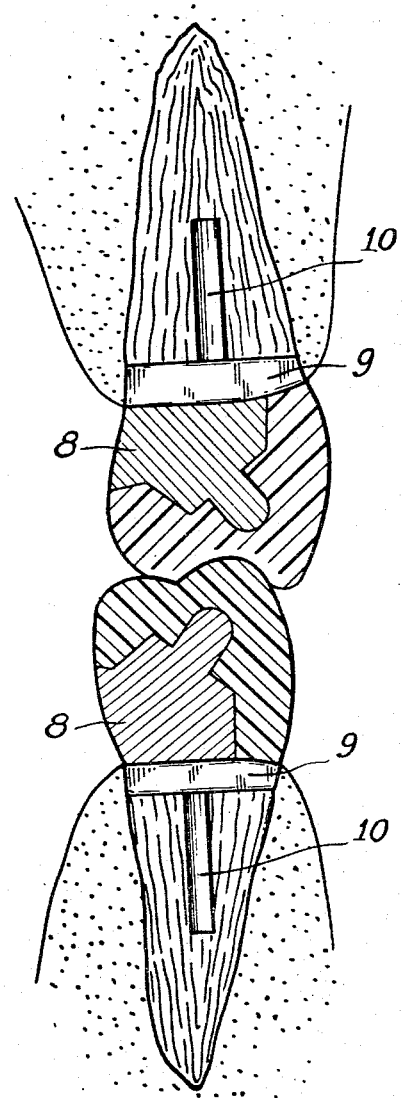
FIG. 2 is a sectional view of a prosthesis according to the invention, arranged in the mouth, and taken at a plane through the molar teeth.

The prosthesis is fixed in the mouth, for example as shown in FIG. 2, by providing the plate 9 with an integral pivot 10 secured in the known manner as in a root.

The supporting element 1 may be used for increasing the weight of a removable prosthesis of the lower jaw. For example, it may be filled with tin and levelled until the required weight is obtained. The tooth thus overweighted is fixed in the conventional manner to a plastic plate.

The elements 1 are introduced in the teeth after plastic material, constituting the base plate of the prosthesis is compressed into the remaining spaces of the weighted elements.

The metal introduced into the supporting element 1 may be magnetic, so as to obtain a repelling action between antagonist jaws.

For the use of the various supporting elements, including devices for increasing the weight and magnetic arrangements, the shape of the inner cavities of the teeth must correspond to the shape of the elements.

Various modifications from the illustrative embodiment shown may be made without departing from the scope of the invention.

Instead of initial standard elements 1 of synthetic material to be replaced and completed to the required shape by the "lost wax" process, metallic standard elements 1 may be employed and such are connected to each other by metal casting, such as welding.

What I claim is:

1. A process for making a dental prosthesis comprising the steps of forming a plaster cast of the area of the patient's gum to receive the prosthesis, applying a wax film to said plaster cast, mounting on said wax film a plurality of artificial teeth having shaped cavities which correspond to the configurations of supporting elements having lugs projecting therefrom so that said cavities receive the wax of said film for holding the artificial teeth thereon, fitting and adjusting the assembly of said artificial teeth and wax film in the patient's mouth, forming a plaster mold of said fitted and adjusted assembly, removing said wax film from the teeth and plaster mold and removing the teeth from the plaster mold, inserting the respective supporting elements in said cavities of the artificial teeth and returning the artificial teeth and supporting elements to their respective positions in said plaster mold, filling the remainder of said plaster mold with wax to temporarily join said supporting elements, removing said artificial teeth from said mold and from said supporting elements temporarily joined by wax, forming an integral metal frame to the shape of said supporting elements and the wax joining the same, and securing the artificial teeth on the portions of said metal frame which correspond to said supporting elements and which are received in said shaped cavities of the teeth.

2. A process according to claim 1; wherein said supporting elements are of metal and define a channel extending along the prosthesis, and said frame is formed by filling said channel with metal to connect said metal supporting elements and integrate the latter in said frame.

3. A process according to claim 1; wherein said supporting elements are of a heat consumable material, and said frame is formed by the lost wax casting process from a pattern constituted by said supporting elements and the wax joining the same so as to be of one-piece, homogeneous construction.

References Cited

UNITED STATES PATENTS

| | | | |
|---|---|---|---|
| 1,188,708 | 6/1916 | Watts | 32—9 |
| 1,613,744 | 1/1937 | Cressler | 32—9 |
| 2,265,391 | 12/1941 | Myerson | 32—10 |
| 3,200,496 | 8/1965 | Spalten | 32—9 |

RICHARD A. GAUDET, *Primary Examiner.*

ROBERT E. MORGAN, *Examiner.*